(12) United States Patent
Dunn

(10) Patent No.: US 10,029,547 B2
(45) Date of Patent: Jul. 24, 2018

(54) TRUCK RACK CANOPY

(71) Applicant: Light Lee Dunn, Delta, CO (US)

(72) Inventor: Light Lee Dunn, Delta, CO (US)

( * ) Notice: Subject to any disclaimer, the term of this patent is extended or adjusted under 35 U.S.C. 154(b) by 0 days.

(21) Appl. No.: 15/142,409

(22) Filed: Apr. 29, 2016

(65) Prior Publication Data

US 2016/0318380 A1 Nov. 3, 2016

Related U.S. Application Data

(60) Provisional application No. 62/155,001, filed on Apr. 30, 2015.

(51) Int. Cl.
*B60J 7/06* (2006.01)

(52) U.S. Cl.
CPC ..................... *B60J 7/068* (2013.01)

(58) Field of Classification Search
CPC ......... B60J 7/068; B60J 7/102; E04F 10/0618
USPC .................................... 296/98, 102
See application file for complete search history.

(56) References Cited

U.S. PATENT DOCUMENTS

| | | | | |
|---|---|---|---|---|
| 1,079,205 A * | 11/1913 | Beebe | ...................... | B60J 7/085 296/98 |
| 3,649,073 A * | 3/1972 | Whittemore | ........... | B60J 7/1614 296/100.08 |
| 4,519,409 A * | 5/1985 | Kinney | ................... | B60P 3/343 135/88.08 |
| 4,877,281 A * | 10/1989 | Altmann | ................. | B60R 13/01 220/495.01 |
| 5,226,689 A * | 7/1993 | Roe | ........................... | B60P 3/34 296/159 |
| 5,340,188 A * | 8/1994 | Goble | .................... | B62D 33/04 296/100.06 |
| 5,601,104 A * | 2/1997 | Perkins | ................... | E04H 15/06 135/88.03 |
| 5,676,414 A * | 10/1997 | Hammond | ............. | B60J 1/2011 296/165 |
| 5,788,319 A * | 8/1998 | Pruitt | ..................... | B60P 3/341 296/164 |
| 5,806,906 A * | 9/1998 | Hammond | ............. | B60J 1/2011 296/165 |
| 6,010,173 A * | 1/2000 | Chyan-Luen | ........ | B60Q 1/2611 296/78.1 |
| 6,283,537 B1 * | 9/2001 | DeVore, III | ............. | B60P 3/341 296/168 |

(Continued)

FOREIGN PATENT DOCUMENTS

| | | | | |
|---|---|---|---|---|
| EP | 1122378 A1 * | 8/2001 | ......... | E04F 10/0659 |
| EP | 1310609 A2 * | 5/2003 | ......... | E04F 10/0588 |

*Primary Examiner* — Pinel E Romain

(57) ABSTRACT

A retractable canopy assembly for mounting to a truck rack to provide shade to a bed of a truck is provided. The retractable canopy assembly comprises a housing sized to fit within a footprint of the truck rack mounted to a vehicle. The housing comprises a mount for mounting to a lower plane portion of the truck rack such that the mounting of the housing does not interfere with a load on an upper plane portion of the truck rack. In addition, a canopy is retractably stowed in the housing, the canopy less than a width of the footprint of the truck rack such that the canopy can be deployed and retracted without interfering with the load on the truck rack, the deployed canopy providing shade to the bed of the truck.

10 Claims, 5 Drawing Sheets

(56) References Cited

U.S. PATENT DOCUMENTS

| | | | | |
|---|---|---|---|---|
| 6,425,623 | B2* | 7/2002 | Nakayama | B60J 11/025 |
| | | | | 296/95.1 |
| 6,598,612 | B1* | 7/2003 | Crowe | E04F 10/0614 |
| | | | | 135/88.11 |
| 6,832,798 | B1* | 12/2004 | Krause | B60R 9/042 |
| | | | | 224/403 |
| 7,281,744 | B1* | 10/2007 | Schultz | B60J 7/1621 |
| | | | | 296/100.1 |
| 7,464,963 | B2* | 12/2008 | Hepner | B60N 2/24 |
| | | | | 280/756 |
| 7,735,898 | B1* | 6/2010 | Bridges | B60J 7/102 |
| | | | | 296/100.01 |
| 7,914,064 | B2* | 3/2011 | Joab | B60J 1/1884 |
| | | | | 296/100.03 |
| 8,191,952 | B2* | 6/2012 | Mokhtari | B60P 3/42 |
| | | | | 224/405 |
| 9,403,424 | B2* | 8/2016 | Cortez | B60J 7/141 |
| 2013/0048237 | A1* | 2/2013 | Mathews | E04F 10/0618 |
| | | | | 160/368.1 |
| 2016/0251872 | A1* | 9/2016 | Tucker | E04H 15/08 |

* cited by examiner

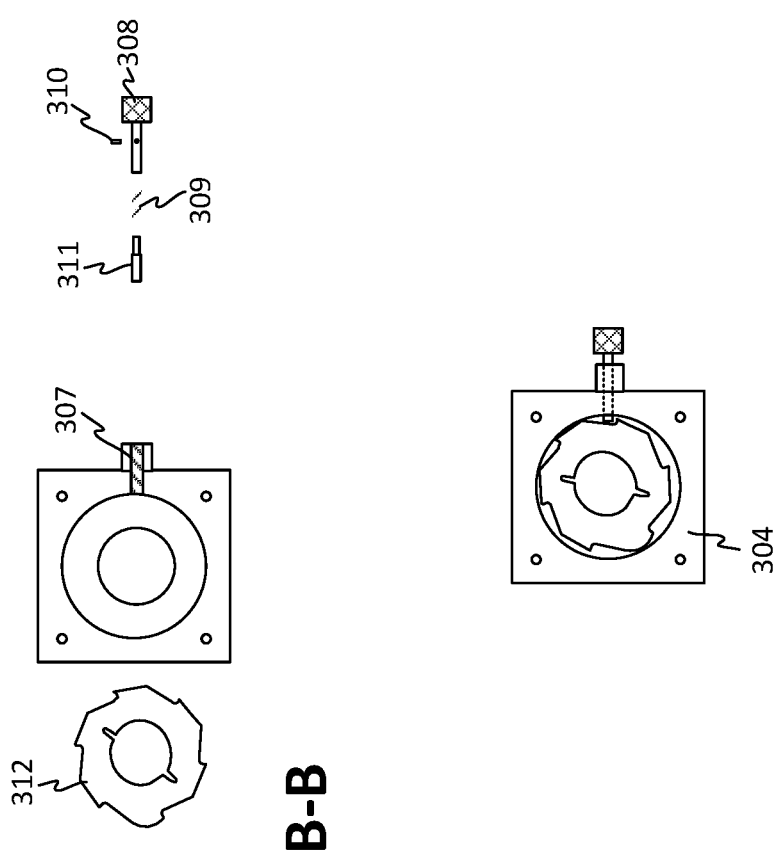

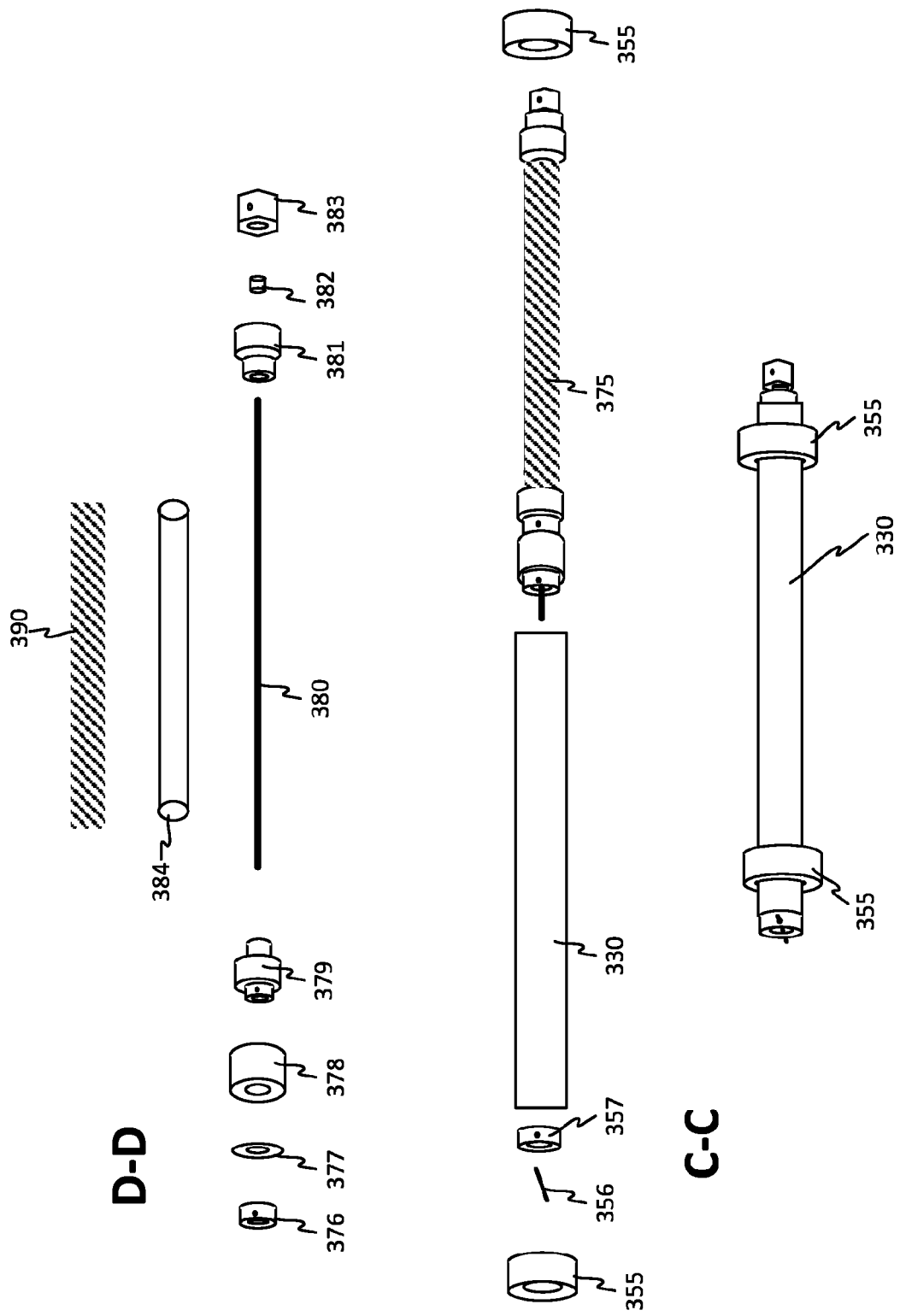

TRUCK RACK CANOPY

CROSS-REFERENCE TO RELATED APPLICATIONS (PROVISIONAL)

This application claims priority to and benefit of U.S. Provisional Patent Application No. 62/155,001 filed on Apr. 30, 2015, entitled "METHOD AND SYSTEM FOR RETRACTABLE AWNING" by Light Lee Dunn, and assigned to the assignee of the present application, the disclosure of which is hereby incorporated herein by reference in its entirety.

TECHNICAL FIELD

Examples described herein relate to a truck rack canopy.

BACKGROUND

Many people use their vehicles for business and work that sometimes requires shade or rain protection for the bed of the vehicle. Embodiments described herein provide a retractable canopy that can be mounted to a load hauling rack to provide some amount of protection to objects thereunder.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description should not be understood as being drawn to scale unless specifically noted.

FIG. 3B is a block diagram of the left end cap of the retractable canopy assembly shown in a complete state and then an exploded state, in accordance with an embodiment.

FIG. 3C is a block diagram of the axle 330 shown in a complete state and then two exploded views of components therein, in accordance with an embodiment.

DETAILED DESCRIPTION

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Figure 1:
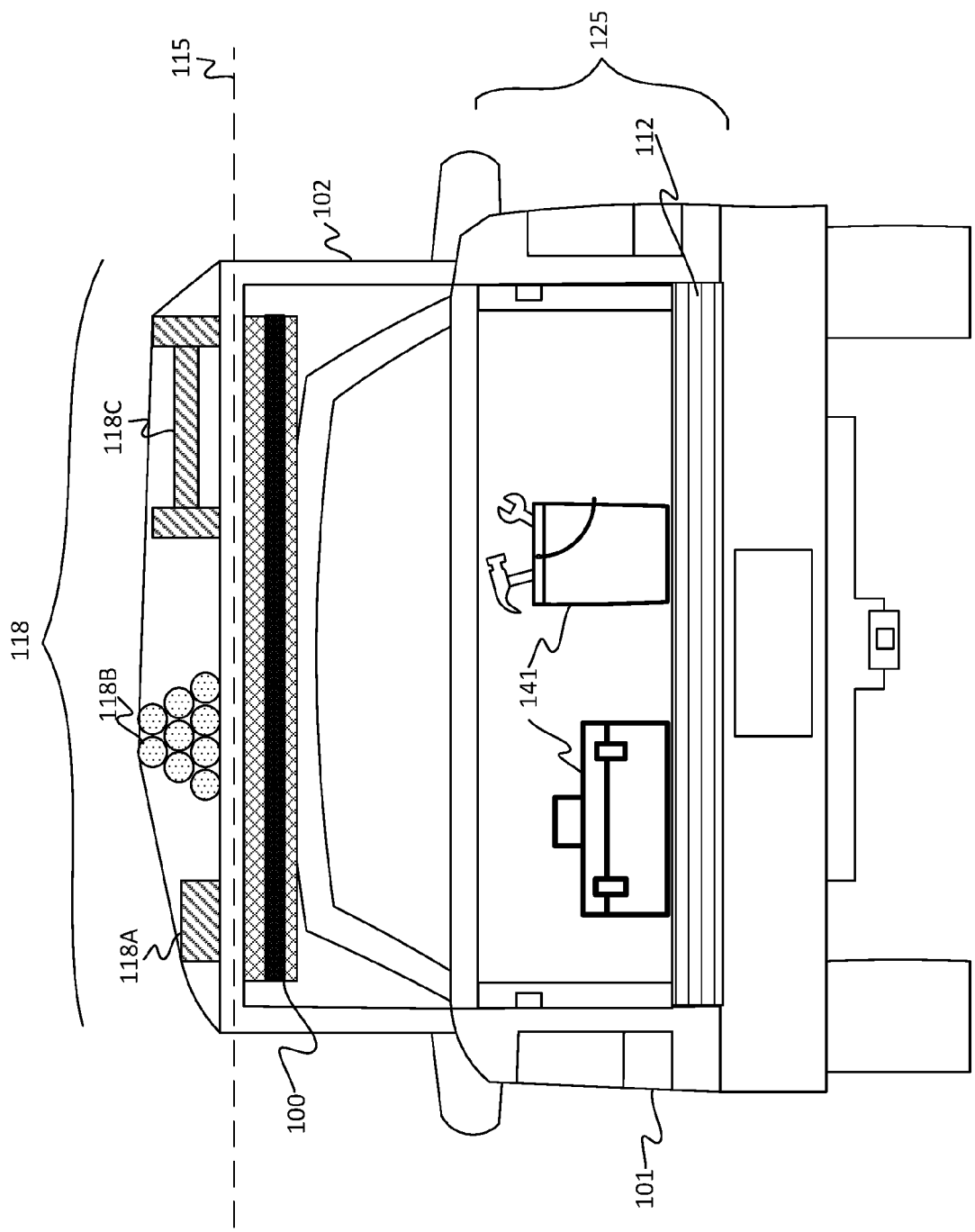
FIG. 1 is a rear view of a vehicle with a truck rack and retractable canopy assembly mounted thereon, in accordance with an embodiment.

With reference to FIG. 1, a rear view of a vehicle 101 having a bed 125 is shown. In addition, vehicle 101 has a truck rack 102 mounted thereon. In one embodiment vehicle 101 is a vehicle that has an open or bed 125 type rear area such as usually found on a pickup truck, work truck, utility truck, Ute, or the like. Although the following discussion focuses on a truck bed example, the discussion of retractable canopy assembly 100 provided herein would also be applicable for any vehicle 101 that had truck rack 102 mounted thereon regardless of its bed 125 status.

In one implementation, truck rack 102 may be any type of rack that is installed in the back of a vehicle 101. Truck rack 102 is mounted on the vehicle 101 to provide a lifted area for carrying load 118 such as lumber 118A, pipe(s) 118B, drywall, fencing, ladder(s) 118C, and the like; while still allowing access to bed 125 of vehicle 101. Examples of truck rack 102 include, but are not limited to, a ladder rack, a headache rack, a lumber rack, etc. Tailgate 112 may be up or down without interfering with the operation of retractable canopy assembly 100. It is shown down in FIG. 1 merely for purposes of clarity to provide an opportunity to show a few of the numerous options for what may be stored in bed 125.

As shown in FIG. 1, the utilization of truck rack 102 for storing/hauling load 118 is that bed 125 remains available for other items such as tools 141 and the like. For example, shown in FIG. 1 are a bucket of tools and a tool box within bed 125. However, it should be appreciated that the equipment in bed 125 may be of a variety to include smaller parts, other tools, storage containers, tool chests, paints, glues, parts buckets, or anything that one may decide to store in bed 125 for convenience, safety, security, personal preference, or the like.

Retractable canopy assembly 100 is coupled with truck rack 102 on the lower side thereof. In other words, retractable canopy assembly 100 is mounted below the plane 115 of truck rack 102. In so doing, retractable canopy assembly 100 does not interfere with any load 118 mounted upon truck rack 102. Moreover, the width of retractable canopy assembly 100 is within the width of the side rails of truck rack 102. As such, deployment and stowage of the canopy portion of retractable canopy assembly 100 can be performed regardless of whether or not truck rack 102 has a load 118 thereon. That is, load 118 will use the portion of truck rack 102 above plane 115 while retractable canopy assembly 100 will use the portion of truck rack 102 below plane 115 and within the side rails thereof.

Figure 2:
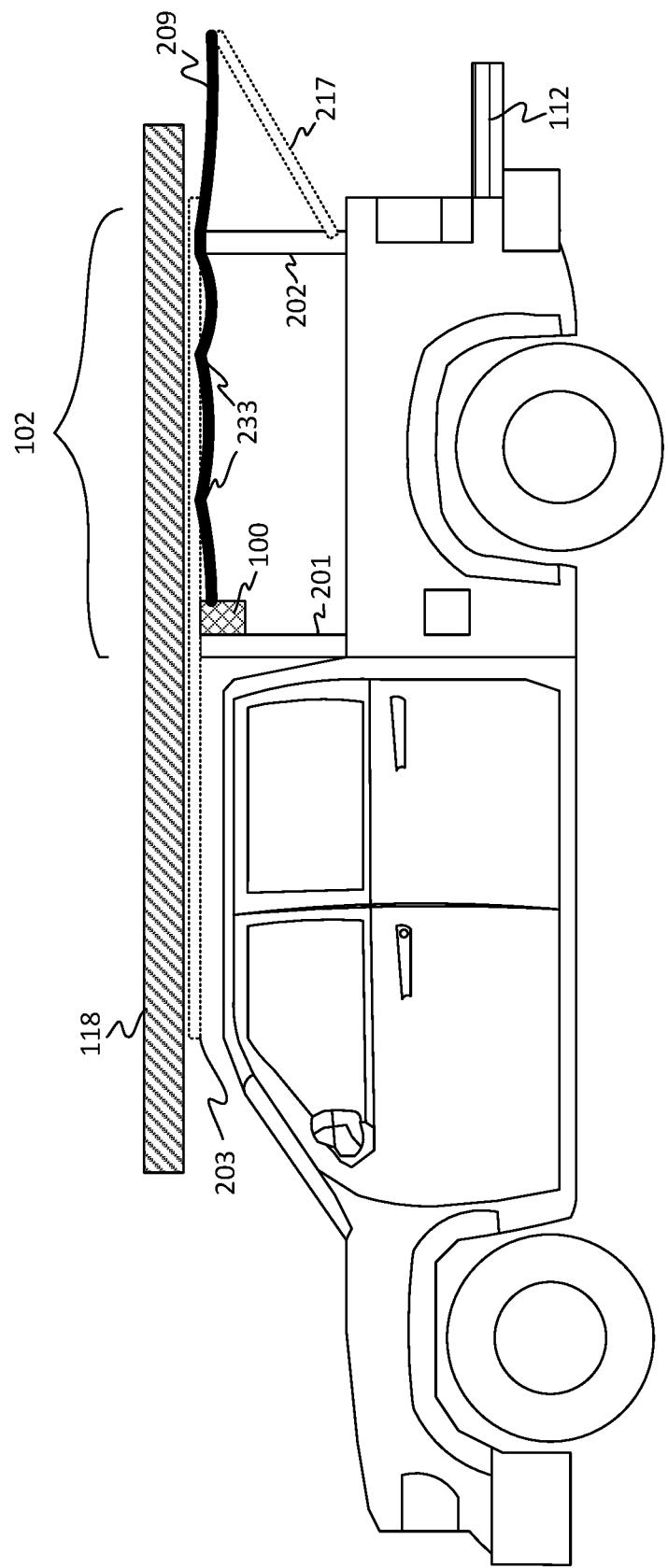
FIG. 2 is a side view of a vehicle with a truck rack and retractable canopy assembly mounted thereon with the canopy deployed, in accordance with an embodiment.

As shown in FIG. 2, in one embodiment, truck rack 102 may be a single piece rack, a rack consisting of a plurality of pieces, or a number of separate pieces that are used in collaboration to form the rack. For example, truck rack 102 will have a front post 201 that will mount on vehicle 101 proximal to the cab and a rear post 202 which will mount proximal to the rear of vehicle 101. In one embodiment there may be one or a plurality of both front post(s) 201 and rear post(s) 202. For example, as shown in FIG. 1, truck rack 102 is mounted to both the right and left side rails of bed 125.

In general, truck rack 102 may be permanent or removable mounted to bed 125. Examples of techniques for mounting truck rack 102 may include bolting, screwing, clamping, welding, and the like. In another embodiment, truck rack 102 may be mounted to the side of vehicle 101 or directly to the floor of bed 125. For example, if vehicle 101 is a stake truck, flatbed truck or the like, e.g., a vehicle without bed rails, truck rack 102 may be directly mounted to other portions of vehicle 101 without deleteriously affecting the operation of retractable canopy assembly 100.

In one embodiment, truck rack 102 may consist of only front post(s) 201 and rear post(s) 202. That is, there may not be any additional structure such as over cab portion 203 (shown with dashed outline) or a portion of rack spanning between front post(s) 201 and rear post(s) 202. If truck rack 102 only consists of front post(s) 201 and rear post(s) 202 then canopy may be used between front post(s) 201 and rear post(s) 202. However, if truck rack 102 does include spans between front post(s) 201 and rear post(s) 202; one or more canopy supports 233 may be used along the spans to provide support for canopy 209 at any different distance from front post(s) 201 toward the back of the vehicle.

Canopy 209 is capable of retracting completely into retractable canopy assembly 100. Moreover, canopy 209 will fit within the perimeter of front post(s) 201 and rear post(s) 202 of truck rack 102 such that it can be pulled from the housing out to any distance along truck rack 102 including all the way to the end of truck rack 102. In one embodiment, additional supports 217 may be used to provide additional support such that canopy 209 may be extended over tailgate 112. As such, not only would the tools in bed 125 remain under canopy 209, but any tools, equipment, lunch, persons or the like that were on tailgate 112 would also be shaded by canopy 209. Thus, canopy 209 may be extended from retractable canopy assembly 100 across any or all of the length of truck rack 102 and, if supports 217 are utilized, may further be extended to provide cover for tailgate 112.

In one embodiment, canopy 209 may be a shade type material that is light weight and only provides shade over bed 125 and whatever is stored therein. However, in another embodiment, canopy 209 may be a water resistant/proof, wind resistant/blocking, etc. material that will provide different levels of protection to objects thereunder. For example, with canopy 209 deployed as a shade, the tools 141, paints, glues, or other objects in bed 125 would be protected from direct sunlight. Similarly, if canopy 209 is made from material providing a level of weatherproofing, the objects in bed 125 would be protected from direct sunlight and rain.

However, it should be appreciated that the canopy 209 would likely not provide the same level of rain resistance as a bed cover, bed cap or the like. Instead, canopy 209 would likely provide cursory protection from the rain as rain could come from the opening between canopy 209 and the sides of bed 125.

In general, the customization of material used in canopy 209 may be customer optional, use specific, or manufacture decided. Thus, for a smaller retractable canopy assembly 100, a thinner canopy 209 material may be used. Similarly, if a thicker canopy 209, which provided additional weatherproof characteristics, was desired, the customer they may simply order the thicker canopy 209 to be used in retractable canopy assembly 100.

Figure 3A:
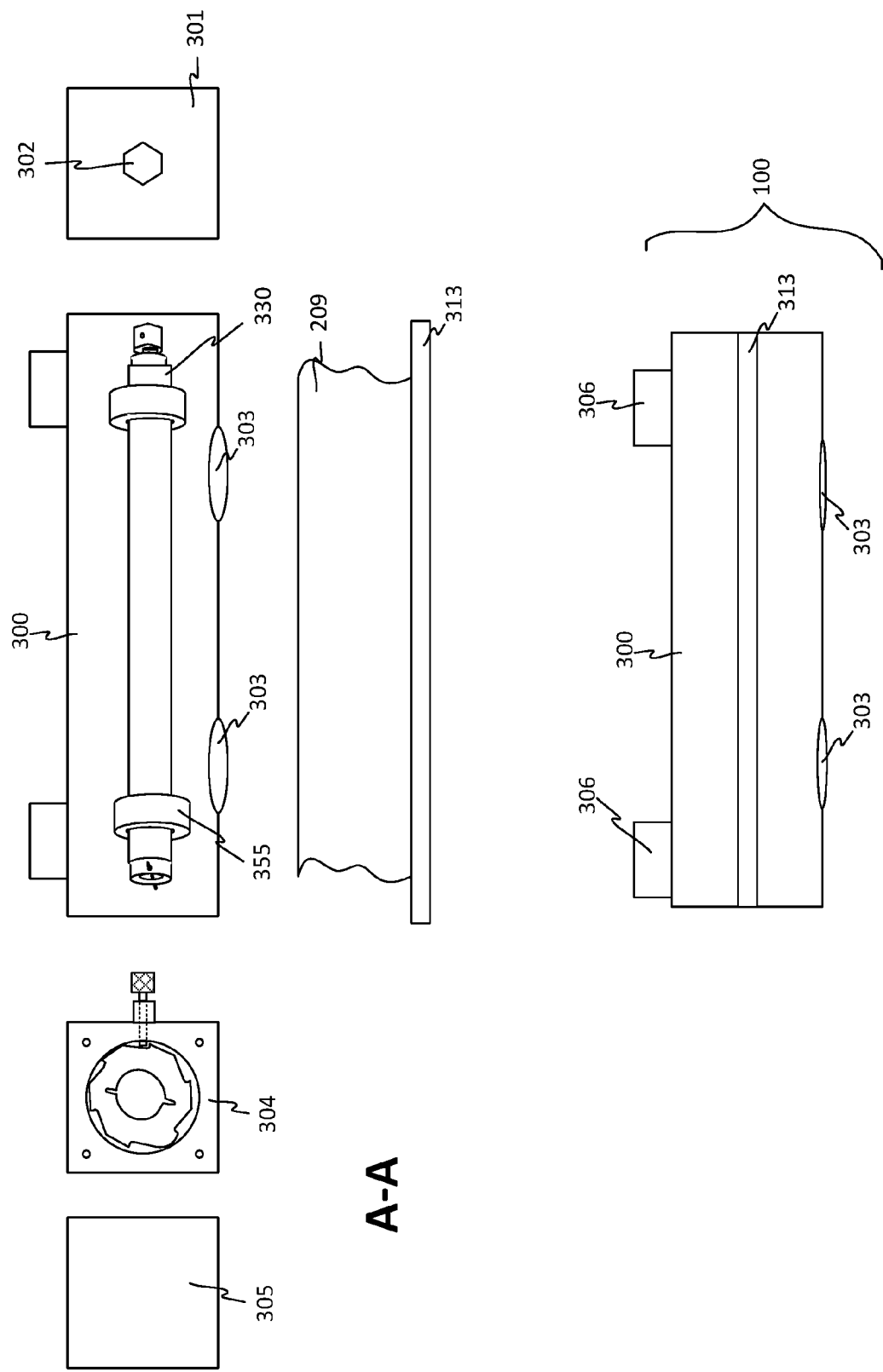
FIG. 3A is a block diagram of retractable canopy assembly shown in a complete and closed state and then an exploded state, in accordance with an embodiment.

In some instances, the different thickness of the material of canopy 209 may also cause different sizing of one or more of the components of retractable canopy assembly 100 as described in FIG. 3A. Thus, the material used for canopy 209 may span the gamut from very thin and ventilated sun shade material to hardy water resistant/proof material. Similarly, the sizing of retractable canopy assembly 100 components, canopy supports 233, optional rear extender supports 217 and the like may be modified, increased in durability, decreased in size, or the like depending upon desired durability, canopy 209 material, geographic location, and the like.

With reference now to FIGS. 3A-3C, a number of exploded views of the parts and components of retractable canopy assembly 100 are shown. Although a number of parts are discussed herein, it should be appreciated that different embodiments may include different parts, parts groupings, combinations of parts into a single part, dissemination of a single part into a plurality of parts, and the like. Moreover, although illustrative embodiments have been described in detail herein with reference to the accompanying drawings, variations to specific embodiments and details are encompassed by this disclosure. It is intended that the scope of embodiments described herein be defined by claims and their equivalents.

Referring now to FIG. 3A, an embodiment of retractable canopy assembly 100 is shown in a complete and closed state. In one embodiment, retractable canopy assembly 100 includes a housing 300 that contains one or more drainage hole(s) 303. Drainage hole(s) 303 utilized to allow water that enters into retractable canopy assembly 100 either via housing 300 or when the canopy is retracted to be able to drain out of the housing.

Retractable canopy assembly 100 further includes mounting brackets 306 and pull handle 313. In general mounting brackets 306 are used to couple housing 300 of retractable canopy assembly 100 to truck rack 102. Mounting brackets 306 may be a number of different shapes and sizes. For example, the mounting may be for a tubular truck rack, a square piped rack, oval tubing, or the like. In addition, mounting brackets 306 may be fixedly or movably coupled with housing 300. For example, housing 300 and mounting brackets 306 may be fixedly coupled at a predefined location for a specific truck rack 102.

In another embodiment, housing 300 and mounting brackets 306 may be fixedly coupled at a customer defined location. In yet another embodiment, one or more of mounting brackets 306 may be adjustably mounted to housing 300 such that the mountings can be moved to different locations allowing a universal type fitment. Although two mounting brackets 306 are shown, more or fewer mounting brackets 306 may also be utilized. In one embodiment, mounting brackets 306 are proximal to the right and left sides of housing 300.

Pull handle 313 is fixedly coupled with canopy 209 and allows a grab and pull location for a user to deploy canopy 209. In one embodiment, when in the retracted position, pull handle 313 will provide a cover over the canopy opening in housing 300. Thus, depending upon the sealing methodology, pull handle 313 may provide a dust seal, water seal, or the like; which may be user definable, manufacturer definable, or predefined at time of manufacture.

With reference now to A-A of FIG. 3A, an exploded view of the initial components within housing 300 are shown in accordance with an embodiment. In one embodiment, the housing consists of left end cover 305, left end cap 304, right end cap 301, and canopy alignment bushing(s) 355. Right end cap 301 includes an axle mount socket within which the right side of axle 330 will fixedly fit. Left end cap 304 includes a ratcheting system discussed in further detail in the FIG. 3B discussion herein. Left end cover 305 provides a cover over the ratchet assembly of left end cap 304. Among other aspects, canopy alignment bushing(s) 355 keep canopy 209 from telescoping on either end when canopy 209 is retracted.

Axle 330 is described in more detail in FIGS. 3B and 3C; In general, axle 330 incorporates a continuous spring therein which is wound up when the awning is deployed. That is, by fixedly coupling the right end of axle 330 with right end cap 301 when the axle rotates as the canopy 209 is deployed, the spring tension builds up on spring 390 (of FIG. 3C). The stored spring energy provides assistance in the retraction of canopy 209.

Referring now to FIG. 3B, an embodiment of left end cap 304 is shown. In B-B an exploded view of the components of left end cap 304 is shown. In one embodiment, left end cap 304 includes a ratchet gear 312, release pin housing 307, lock pin 311, lock pin spring 309, stop pin 310 and release pin 308. In general, the ratcheting system of left end cap 304 is utilized to provide a positive stop for the retraction of canopy 209.

For example, as canopy 209 is pulled out for deployment, the spring assembly of axle 330 will start to increase the tension. By using a ratchet gear 312 along with the release pin assembly, ratchet gear 312 will allow the canopy 209 to be pulled outward. As is seen from B-B as ratchet gear 312 is rotated in the direction of deployment, the tooth shape will provide pressure to lock pin 311 which will push up against lock pin spring 309 and allow the canopy to be unfurled. However, when rotated the opposite direction, ratchet gear 312 will bind against lock pin 311 and will not allow the retraction of canopy 209. Thus, the canopy is positively locked out until a user pulls on release pin 308.

Once release pin 308 is retracted, lock pin 311 will be outside of the rotation of ratchet gear 312 and the canopy will be able to be retracted. Thus, the use of release pin 308 ensures that the canopy does not retract accidentally due to getting hooked on a tool, lumber, user, or the like. Instead, it will remain deployed until the release pin is deployed. In one embodiment, when completely retracted, release pin 308 is covered by pull handle 313.

Referring now to FIG. 3C, an embodiment of axle 330 including two exploded views of components therein is shown. In FIG. 3C, axle 330 is shown with canopy alignment bushings 355. As stated herein, axle 330 is the underlying mechanism to which canopy 209 is coupled (e.g., via glue, screws, stitching or the like). The unrolling of canopy 209 will increase tension on the spring assembly 375 within axle 330 providing a measure of assistance in retracting canopy 209. Alignment bushings 355 are used to keep the location of canopy 209 consistent during the deployment and retraction phases. For example, one alignment bushing 355 on either side of canopy 209 will keep the canopy rolling up on itself without telescoping off of either end of axle 330.

With reference now to C-C of FIG. 3C, an exploded view of the components within axle 330 are shown in accordance with an embodiment. In one embodiment, axle 330 components include canopy alignment bushing(s) 355, axle pin 356, axle bushing 357, and spring assembly 375. In one embodiment, axle pin 356 fits within the groove shown in ratchet gear 312 and is what forms the positive connection between axle 330 and left end cap 304.

Axle bushing 357 also fits within the opening in left end cap 304 and provides a friction reduced surface within which spring assembly 375 can rotate. Thus, one end of spring assembly (e.g., the axle 330) is fixed at right end cap 301 while the other end is rotationally coupled with left end cap 304. As discussed herein, this orientation allows the deployment of canopy 209 to increase the spring torsion of spring assembly 375 while also allowing the ratchet gear 312 to limit the retraction of the canopy until it is positively desired.

With reference now to D-D of FIG. 3C, an exploded view of spring assembly 375 are shown in accordance with an embodiment. In one embodiment, spring assembly 375 components include collet 376, washer 377, float bushing 378, inner spring retainer 379, spring mounting rod 380, tubing 384, spring 390, outer spring retainer 381, friction bearing 382 and axle mount 383.

In one embodiment, spring 390 is a continuous spring that may be selected based on its spring characteristics. For example, a heavy (or longer) canopy 209 would likely require a stronger spring than a light (or short) canopy 209. In general, spring mounting rod 380 is inserted into tubing 384 which is of a diameter slightly smaller than spring 390. Inner spring retainer 379 and outer spring retainer 381 are then provided on either side of spring mounting rod 380. On the right side friction bearing 382 is then placed on spring mounting rod 380 and axle mount 383 is placed thereafter. In one embodiment, axle mount 383 includes a threaded opening to allow a lock screw to fixedly couple axle mount 383 with spring mounting rod 380.

On the left hand side, float bushing 378 is placed next to inner spring retainer 379 and then washer 377 is placed. Finally, in one embodiment, collet 376 is pressed into tubing 384 to keep the components in the proper location. In general, spring 390 will include a mounting feature such as a hook or the like at one end to couple with inner or outer spring retainers. In so doing, when the retainers are rotated due to the deployment of canopy 209, the spring will begin to be wound up. Once assembled, spring assembly 375 is then inserted into axle 330 and axle bushing 357 and axle pin 356 are coupled with the left hand side of spring assembly 375 as discussed herein.

In different embodiments, there may be a plurality of threaded opening to allow a lock screw to be used between pluralities of components. For example, in one embodiment, collet 376, inner spring retainer 379, axle mount 383 and axle bushing 357 are shown with threaded openings. However, in another embodiment, one or more may be fixedly attached such as via glue, epoxy, welding, soldering, or the like to provide a similar fixed coupling.

The foregoing Description is not intended to be exhaustive or to limit the embodiments to the precise form described. Instead, example embodiments in this Description have been presented in order to enable persons of skill in the art to make and use embodiments of the described subject matter. Moreover, various embodiments have been described in various combinations. However, any two or more embodiments may be combined. Although some embodiments have been described in a language specific to structural features and/or methodological acts, it is to be understood that the subject matter defined in the appended claims is not necessarily limited to the specific features or acts described above. Rather, the specific features and acts described above are disclosed by way of illustration and as example forms of implementing the claims and their equivalents.

What is claimed is:

1. A retractable canopy assembly configured to mount to a lumber rack wherein said lumber rack is configured to mount to a vehicle, and wherein said lumber rack has a plane corresponding thereto, said retractable canopy assembly configured to provide shade to a portion of said vehicle below said lumber rack, said retractable canopy assembly comprising:

a housing sized to fit within a width of side rails of said lumber rack with a plane;

a mount configured to couple said housing to said truck below said plane of said lumber rack such that when said housing is coupled to said lumber rack said housing does not interfere with a load disposed above said plane; and a canopy, said canopy retractably stowable in said housing, said canopy fitting within the perimeter of said lumber rack such that said canopy can be retractably deployed from said housing towards a tailgate of said truck and retracted back into said housing without interfering with said load disposed above said plane said canopy, when deployed from said housing, provides shade to the portion of the vehicle underlying said canopy.

2. The retractable canopy assembly of claim 1 further comprising:

a plurality of rear extender supports, said rear extender supports coupled with said lumber racks rear, of a vertical height, and extending towards said tailgate of said truck an extended amount, said plurality of rear extender supports configured to support said canopy such that, when said canopy, is fully deployed, and coupled to said plurality of rear extender supports, said canopy covers said vertical height plus said extended amount.

3. The retractable canopy assembly of claim 1 further comprising:

an axle having a spring assembly therein, said axle coupled with said canopy:

a left end cap coupled with said housing, said left end cap comprising:

a ratchet gear, said ratchet gear coupled with said axle; and a release pin assembly coupled with said ratchet gear, said release pin assembly having a first position where said release pin assembly is engaged with said ratchet gear such that, said canopy can be deployed but not retracted, said release pin assembly having a second position wherein said release pin assembly is disengaged with said ratchet gear such that, said canopy can be deployed or retracted freely, and will automatically return into said housing when said canopy is released due to said spring assembly.

4. The release pin assembly of claim 3 further comprising:

a release pin, the release pin comprising a knob end and a hollow end:

a stop pin, fitted through a hole near said knob end of said release pin, a spring, the spring stowed within said hollow end of the release pin resting against said stop pin; and a lock pin, said lock pin fitting within said hollow end against said spring and a lower end having a shape to interact with the ratchet gear, such that a when said canopy is pulled out, said ratchet gear causes said lock pin to move into said hollow end of said release pin and compress said spring, and when said canopy is retracted said ratchet gear causes said lock pin to remain extended from said hollow end and stops the rotation of said ratchet gear.

5. The retractable canopy assembly of claim 1 further comprising:

an opening in said housing for deploying said canopy; and a pull handle coupled with an end of said canopy, said pull handle configured to seal said opening in said housing when said canopy is retracted into said housing.

6. A retractable canopy assembly configured to mount to a truck rack wherein said truck rack is configured to mount to a truck, and wherein said truck rack has a plane corresponding thereto, said retractable canopy assembly configured to provide weather protection to a at least a portion of a contents in a bed of said truck, said retractable canopy assembly comprising:

a housing sized to fit within a width of side rails of said truck rack with a plane;

a mount configured to couple said housing to said truck below said plane of said truck rack such that when said housing is coupled to said truck rack said housing does not interfere with a load disposed above said plane;

a canopy, said canopy retractably stowable in said housing, said canopy fitting within the perimeter of said truck rack such that said canopy can be retractably deployed from said housing towards a tailgate of said truck and retracted back into said housing without interfering with said load disposed above said plane said canopy, when deployed from said housing, provides weather protection to a portion of said bed of said truck underlying said canopy:

an axle having a spring assembly therein, said axle coupled with said canopy:

a left end cap coupled with said housing, said left end cap comprising:

a ratchet gear, said ratchet gear coupled with said axle; and a release pin assembly coupled with said ratchet gear, said release pin assembly having a first position where said release pin assembly is engaged with said ratchet gear such that, said canopy can be deployed but not retracted, said release pin assembly having a second position wherein said release pin assembly is disengaged with said ratchet gear such that, said canopy can be deployed or retracted freely, and will automatically return into said housing when said canopy is released due to said spring assembly.

7. The release pin assembly of claim 6 further comprising:

a release pin, the release pin comprising a knob end and a hollow end;

a stop pin, fitted through a hole near said knob end of said release pin, a spring, the spring stowed within said hollow end of the release pin resting against said stop pin; and a lock pin, said lock pin fitting within said hollow end against said spring and a lower end having a shape to interact with the ratchet gear, such that a when said canopy is pulled out, said ratchet gear causes said lock pin to move into said hollow end of said release pin and compress said spring, and when said canopy is retracted said ratchet gear causes said lock pin to remain extended from said hollow end and stops the rotation of said ratchet gear.

8. The retractable canopy assembly of claim 6 further comprising:

an opening in said housing for deploying said canopy; and a pull handle coupled with an end of said canopy, said pull handle configured to seal said opening in said housing when said canopy is retracted into said housing.

9. A retractable canopy assembly configured to mount to a truck rack wherein said truck rack is configured to mount to a truck, and wherein said truck rack has a plane corresponding thereto, said retractable canopy assembly configured to provide shade to a bed of said truck, said retractable canopy assembly comprising:

a housing sized to fit within a width of side rails of said truck rack with a plane:
a mount configured to couple said housing to said truck below said plane of said truck rack such that when said housing is coupled to said truck rack said housing does not interfere with a load disposed above said plane:
a canopy, said canopy retractably stowable in said housing, said canopy fitting within the perimeter of said truck rack such that said canopy can be retractably deployed from said housing towards a tailgate of said truck and retracted back into said housing without interfering with said load disposed above said plane said canopy, when deployed from said housing, provides shade to a portion of said bed of said truck underlying said canopy:
an axle having a spring assembly therein, said axle coupled with said canopy:
a left end cap coupled with said housing, said left end cap comprising:
 a ratchet gear, said ratchet gear coupled with said axle; and
 a release pin assembly coupled with said ratchet gear, said release pin assembly having a first position where said release pin assembly is engaged with said ratchet gear such that, said canopy can be deployed but not retracted, said release pin assembly having a second position wherein said release pin assembly is disengaged with said ratchet gear such that, said canopy can be deployed or retracted freely, and will automatically return into said housing when said canopy is released due to said spring assembly.

10. A retractable canopy assembly configured to mount to a truck rack wherein said truck rack is configured to mount to a truck, and wherein said truck rack has a plane corresponding thereto, said retractable canopy assembly configured to provide shade to a bed of said truck, said retractable canopy assembly comprising:
 a housing sized to fit within a width of side rails of said truck rack with a plane:
 a mount configured to couple said housing to said truck below said plane of said truck rack such that when said housing is coupled to said truck rack said housing does not interfere with a load disposed above said plane:
 a canopy, said canopy retractably stowable in said housing, said canopy fitting within the perimeter of said truck rack such that said canopy can be retractably deployed from said housing towards a tailgate of said truck and retracted back into said housing without interfering with said load disposed above said plane said canopy, when deployed from said housing, provides shade to a portion of said bed of said truck underlying said canopy:
 an axle having a spring assembly therein, said axle coupled with said canopy:
 a left end cap coupled with said housing, said left end cap comprising:
  a ratchet gear, said ratchet gear coupled with said axle:
  a release pin assembly coupled with said ratchet gear, said release pin assembly having a first position where said release pin assembly is engaged with said ratchet gear such that, said canopy can be deployed but not retracted, said release pin assembly having a second position wherein said release pin assembly is disengaged with said ratchet gear such that, said canopy can be deployed or retracted freely, and will automatically return into said housing when said canopy is released due to said spring assembly, said release pin assembly comprising:
   a release pin, the release pin comprising a knob end and a hollow end:
   a stop pin, fitted through a hole near said knob end of said release pin:
   a spring, the spring stowed within said hollow end of the release pin resting against said stop pin; and
   a lock pin, said lock pin fitting within said hollow end against said spring and a lower end having a shape to interact with the ratchet gear, such that a when said canopy is pulled out, said ratchet gear causes said lock pin to move into said hollow end of said release pin and compress said spring, and when said canopy is retracted said ratchet gear causes said lock pin to remain extended from said hollow end and stops the rotation of said ratchet gear.

* * * * *